US012567812B2

(12) United States Patent
Kunitama et al.

(10) Patent No.: US 12,567,812 B2
(45) Date of Patent: Mar. 3, 2026

(54) HIGH-FREQUENCY POWER SUPPLY DEVICE AND OUTPUT CONTROL METHOD THEREFOR

(71) Applicant: KYOSAN ELECTRIC MFG. CO., LTD., Yokohama (JP)

(72) Inventors: Hiroshi Kunitama, Yokohama (JP); Kunihiro Muto, Yokohama (JP); Takuya Yoshida, Yokohama (JP); Koichi Miyazaki, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 83 days.

(21) Appl. No.: 17/798,794

(22) PCT Filed: Dec. 24, 2020

(86) PCT No.: PCT/JP2020/048552
§ 371 (c)(1),
(2) Date: Aug. 10, 2022

(87) PCT Pub. No.: WO2021/161674
PCT Pub. Date: Aug. 19, 2021

(65) Prior Publication Data
US 2023/0134084 A1 May 4, 2023

(30) Foreign Application Priority Data
Feb. 14, 2020 (JP) ................................. 2020-023775

(51) Int. Cl.
*H02M 5/458* (2006.01)
*H05H 1/46* (2006.01)

(52) U.S. Cl.
CPC .............. *H02M 5/458* (2013.01); *H05H 1/46* (2013.01); *H05H 2242/24* (2021.05)

(58) Field of Classification Search
CPC ............ H02M 5/40; H02M 5/42; H02M 5/45; H02M 5/451; H02M 5/453; H02M 5/458
See application file for complete search history.

(56) References Cited

U.S. PATENT DOCUMENTS 3,697,717 A * 10/1972 Kornrumpf ............ H05B 6/062
                                                              219/625
4,121,592 A * 10/1978 Whalley ................ A61N 1/403
                                                              607/98
(Continued)

FOREIGN PATENT DOCUMENTS

DE        10221765 A1     12/2003
EP         2854273 A1      4/2015
(Continued)

OTHER PUBLICATIONS

International Search Report dated Mar. 2, 2021, issued in counterpart International Application No. PCT/JP2020/048552. (2 pages).
(Continued)

*Primary Examiner* — Gary L Laxton
(74) *Attorney, Agent, or Firm* — WHDA, LLP

(57) ABSTRACT

A high-frequency power supply device is provided with an AC-DC converter for converting an input from a three-phase alternating-current source into a direct current and a high-frequency amplifier including multiple FET elements and outputting a high-frequency alternating-current power, with the output of the AC-DC converter being directly input to the high-frequency amplifier, and further includes a phase conversion circuit for imparting phase differences to gate signals to be input to the multiple FET elements so as to offset fluctuation components included in the direct current. The device generates the high-frequency alternating-current power by converting the input from the three-phase alternating-current source into the direct current, directly inputting the direct current to the high-frequency amplifier,
(Continued)

imparting the phase differences to the gate signals to be input to the multiple FET elements so as to offset the fluctuation components included in the direct current, and performing switching.

10 Claims, 5 Drawing Sheets

(56) References Cited

U.S. PATENT DOCUMENTS

| | | | | |
|---|---|---|---|---|
| 6,028,777 | A * | 2/2000 | Nguyen | H02M 7/48 |
| | | | | 363/37 |
| 9,590,565 | B2 * | 3/2017 | Yuzurihara | H05H 1/36 |
| 10,912,580 | B2 * | 2/2021 | Green | A61B 18/1206 |
| 2005/0139259 | A1 * | 6/2005 | Steigerwald | H02J 7/35 |
| | | | | 136/244 |
| 2015/0280449 | A1 * | 10/2015 | Ono | B60L 53/22 |
| | | | | 307/104 |
| 2015/0372615 | A1 * | 12/2015 | Ayyanar | H02M 7/48 |
| | | | | 363/131 |
| 2018/0288839 | A1 | 10/2018 | Safaee | |
| 2019/0020298 | A1 * | 1/2019 | Götz | B60L 53/14 |

FOREIGN PATENT DOCUMENTS

| | | |
|---|---|---|
| JP | 2000-102290 A | 4/2000 |
| JP | 2011-229365 A | 11/2011 |
| JP | 2013-126259 A | 6/2013 |
| JP | 2015-144505 A | 8/2015 |
| JP | 2016-073124 A | 5/2016 |

OTHER PUBLICATIONS

Exteded (Supplementary) European Search Report dated Feb. 12, 2024, issued in counterpart EP Application No. 20919202.0. (9 pages).
Kinnares V. et al., Circuit Analysis and Modeling of a Phase-Shifted Pulsewidth modulation Full-Bridge-Inverter-Fed Ozone Generator With Constant Applied Electrode Voltage, IEEE Transactions on Power Electronics, Institute of Electrical and Electronics Engineers, USA, vol. 25, No. 7, Jul. 2010, p. 1739-1752, XP011301341. (9 pages).
Ahn H. et al., Control Method of Input-Parallel and Output-Series Connected Inverters for Plasma Generator, IEEE Applied Power Electronics Conference and Exposition (APEC), IEEE, Mar. 4, 2018, p. 3563-3568, XP033347794. (6 pages).
Office Action dated Mar. 19, 2024, issued in counterpart KR Application No. 10-2022-7026598, with English translation. (8 pages).
Office Action dated Oct. 13, 2025, issued in counterpart EP Application No. 20919202.0. (6 pages).
Office Action dated Dec. 10, 2025, issued in counterpart CN Application No. 202080095818.X, with English translation. (11 pages).

* cited by examiner

HIGH-FREQUENCY POWER SUPPLY DEVICE AND OUTPUT CONTROL METHOD THEREFOR

TECHNICAL FIELD

The present invention relates to a high-frequency power supply device to be applied to a plasma generation device and others, in particular a high-frequency power supply device comprising an AC-DC converter for converting an input from a three-phase AC source into a direct current and a high-frequency amplifier including a plurality of FET elements, and to an output control method therefor.

BACKGROUND ART

A high-frequency power supply device is applied as a power supply device for ultrasonic oscillation, induced electromotive force generation, plasma generation or others, and there is a known power supply device as one example that converts an input from a three-phase AC source into a direct current (DC), and then converts it into high-frequency AC power by means of a DC-RF conversion unit to thereby output the AC power. As such a high-frequency power supply device to be applied to a plasma processing system, for instance, Patent Literature 1 discloses a high-frequency power source comprising any amplifier of high frequency or the like, which includes an AC-DC conversion unit, a DC-DC conversion unit, a high-frequency generation unit (AC power output means), an RF detection unit and an RF power control unit, in which a DC-RF conversion unit includes MOSFETs as switch elements, so as to convert an input from an AC commercial power source into certain high frequency AC power. With such a high-frequency power source, it is said that output power can be stably and suitably controlled in a wide range.

CITATION LIST

Patent Literature

Patent Literature 1 Japanese Patent Laid-Open Publication No. 2015-144505

SUMMARY OF THE INVENTION

Problems to be Solved by the Invention

In the conventional high-frequency power source described above, when an input from a three-phase commercial power source is converted into a direct current by the AC-DC conversion unit, an output thus obtained is accompanied by voltage fluctuations, which are so-called "ripples". Thus, the output is processed by the DC-DC conversion unit to reconvert into a DC voltage with the ripples being removed, and sent to the DC-RF conversion unit. At this time, in the case of performing the output control by the DC-RF conversion unit, a response speed in the high-frequency amplifier that constitutes the DC-RF conversion unit is dependent on a response speed, which is an input, in the DC-DC conversion unit.

A typical DC-DC conversion unit (converter) consists of an inverter and a rectification circuit or chopper circuit, each component including a switching element as well as an LC filter for smoothing an output. In order to reduce the above-mentioned ripples by the DC-DC conversion unit, a resonance frequency in the LC filter is usually set to be equal to or less than one-tenth of a switching frequency of each switching element.

Furthermore, as disclosed in the high-frequency power source of Patent Literature 1, when an output from the RF detection unit is detected to perform feedback control on the DC-DC conversion unit, it is necessary to set a response frequency in a feedback loop to be much lower than the resonance frequency in the LC filter that corresponds to an output from the DC-RF conversion unit (e.g., equal to or less than one-tenth of the resonance frequency in the LC filter). Thus, in the high-frequency power source that performs the control of removing the ripples by the conventional DC-DC conversion unit, since a response speed of an output voltage depends on the switching frequency in the DC-DC conversion unit and is about one hundredth of the switching frequency, there is a problem that it is difficult to perform the output control with a high response frequency of several kHz, several tens kHz or so even by using MOS-FETs or similar, which are operable at high speed, to the switching elements of the DC-DC conversion unit.

The present invention is for solving the above-described conventional problem, and aims to provide a high-frequency power supply device and an output control method therefor in order to reduce the ripples caused by the DC conversion of the input from the three-phase AC power source and enable the output control at a high frequency band.

Means for Solving the Problem

In order to solve the above problem, the present invention has a principal aspect that is a high-frequency power supply device including an AC-DC conversion unit that converts an input from a three-phase power source into a direct current, and a high-frequency amplifier that includes a plurality of FET elements and outputs high-frequency AC power, wherein an output from the AC-DC conversion unit is directly input to the high-frequency amplifier. The high-frequency power supply device further includes a phase conversion circuit that provides to a gate signal to be input to each of the plurality of FET elements with a phase difference for cancelling a fluctuation component contained in the direct current.

Another aspect of the invention is an output control method for outputting an input from a three-phase AC power source as high-frequency AC power by using a high-frequency amplifier which includes a plurality of FET elements. This method is for converting the input from the three-phase AC power source into a direct current and directly inputting it to the high-frequency amplifier, and providing to a gate signal to be input to each of the plurality of FET elements with a phase difference for cancelling a fluctuation component contained in the direct current to perform switching, so as to generate the high-frequency AC power.

In accordance with the invention with the above-described configuration, the input from the three-phase AC power source is converted into the direct current and directly inputted to the high-frequency amplifier, and the phase difference for cancelling the fluctuation component contained in the direct current is provided to the gate signal to be input to each of the plurality of FET elements and thus the switching is performed to generate the high-frequency AC power, thereby enabling to reduce the ripples caused by the direct conversion of the input from the three-phase AC power source while performing the output control at the high frequency band.

BEST MODE FOR CARRYING OUT THE INVENTION

A description will now be made about representative illustrative embodiments of a high-frequency power supply device and an output control method therefor according to the present invention by referring to FIGS. 1 to 6.

Figure 1:
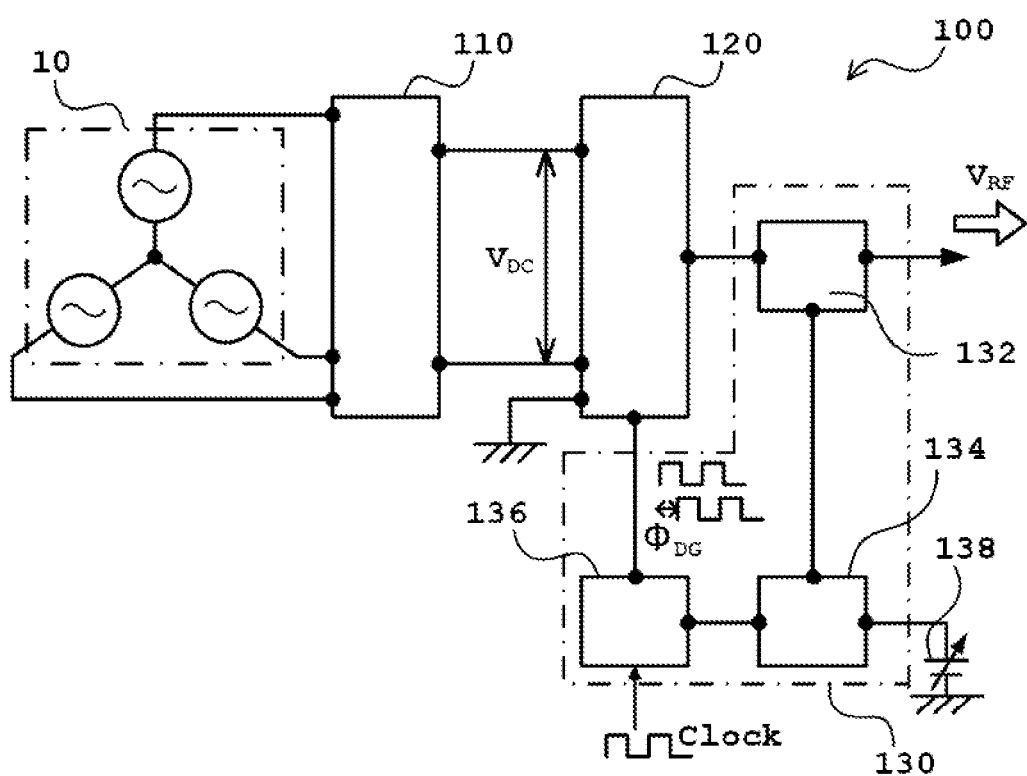
FIG. 1 is a block diagram showing schematically a high-frequency power supply device according to a representative example of the invention.

FIG. 1 is a block diagram that schematically shows a high-frequency power supply device according to a representative example of the invention. As shown in FIG. 1, a high-frequency power supply device 100 includes an AC-DC conversion unit 110 that converts an input from a three-phase power source 10 into a direct current, a high-frequency amplifier 120 that includes a plurality of FET elements 122A to 122B', which will be described later, and outputs a high-frequency AC output $V_{RF}$, and a phase conversion circuit 130 that provides to a gate signal $V_{gs}$ to be input to each of the FET elements 122A to 122B' with a phase difference for cancelling a fluctuation component contained in the direct current. The significant feature of the high-frequency power supply device 100 is that an output $V_{DC}$ of the AC-DC conversion unit 110 is directly input into a high-frequency amplifier 120.

The AC-DC conversion unit 110 is configured as a circuit block that converts an input from a three-phase AC power source 10 for commercial use into a DC voltage $V_{DC}$, and such circuit block may be a three-phase rectification circuit, a three-phase power factor correction circuit or similar. The high-frequency amplifier 120 is a circuit block that converts the DC voltage $V_{DC}$ from the AC-DC conversion unit 110 into AC power at a predetermined frequency (high frequency of several hundreds kHz to several tens MHz), whose specific configuration will be described later.

The phase conversion circuit 130 includes, as an example, an output detection unit 132 that detects an output voltage or output power output of a high-frequency AC output $V_{RF}$ from the high-frequency amplifier 120 as an output detection value, an error calculation control unit 134 that determines an amount of operation for controlling a phase difference in the gate signal $V_{gs}$ to be input to the high-frequency amplifier 120 based on a difference between the output detection value detected in the output detection unit 132 and an output command value, and a gate signal generation circuit 136 that generates the gate signal $V_{gs}$ to be input to each of the FET elements 122A to 122B' of the high-frequency amplifier 120 when the phase difference is adjusted according to the amount of operation determined by the error calculation control unit 134. The error calculation control unit 134 is grounded through an output command 138, and calculates an amount of operation necessary for adjusting a phase difference $\phi_{DG}$ to be given to the gate signal $V_{gs}$ based on an amount of ripples (affected component of $V_{rip}$ shown in FIG. 4) included in the output detection value of the high-frequency AC output $V_{RF}$, for instance, so as to issue an output command of the gate signal $V_{gs}$ including the phase difference $\phi_{DG}$ to the gate signal generation circuit 136. Then, the gate signal generation circuit 136 generates and outputs gate signals $V_{gs}A$ to $V_{gs}B'$ to be input to the FET elements 122A to 122B' after the phase difference is set according to the amount of operation obtained from the error calculation control unit 134.

Figure 2:
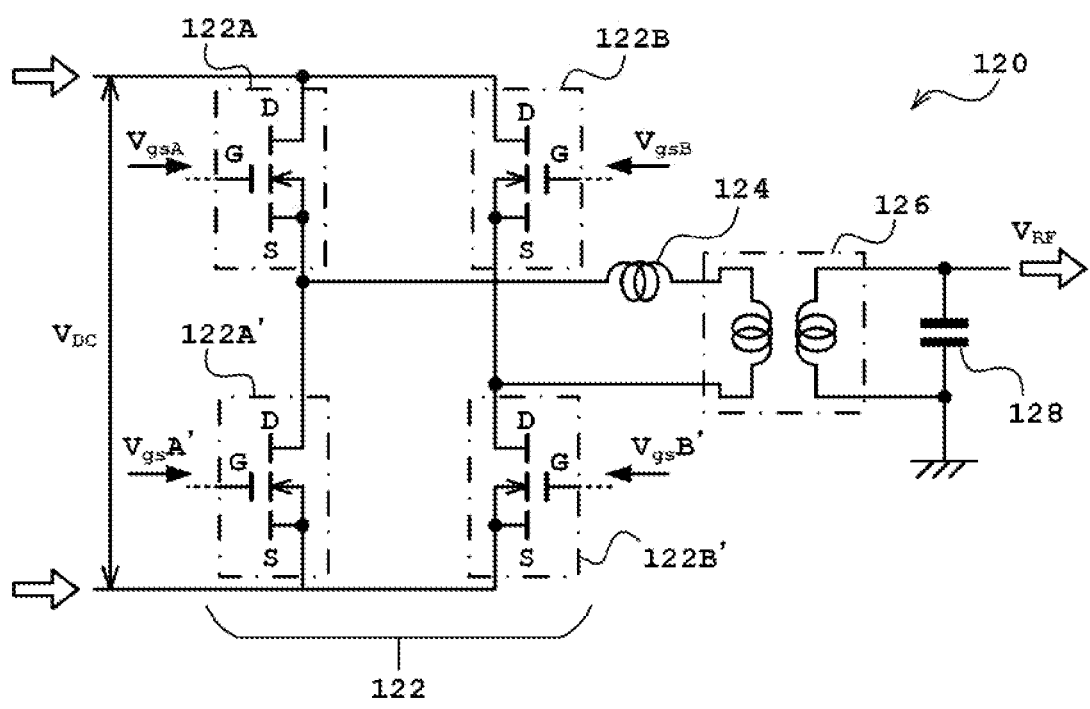
FIG. 2 is a circuit diagram showing an equivalent connection circuit of the high-frequency amplifier shown in FIG. 1.

FIG. 2 is a circuit diagram showing an equivalent connection circuit of the high-frequency amplifier shown in FIG. 1. As shown in FIG. 2, the high-frequency amplifier 120 in FIG. 1 consists of, as an example, a so-called full-bridge circuit 122 by use of four FET elements 122A, 122A', 122B and 122B', a coil 124 connected to one of the outputs of the full-bridge circuit 122, a transformer 126 connected on an output part of the full-bridge circuit 122, and a capacitor 128 connected on an output part of the transformer 126. In addition to that, the coil 124 and the capacitor 128 serve as high-frequency filters. The capacitor 128 may be arranged on an input part of the transformer. Furthermore, the coil 124 may be a wiring inductance as long as it looks like a lagging load (inductive load).

The full-bridge circuit 122 is configured in such a way that the DC voltage $V_{DC}$ output from the AC-DC conversion unit 110 is applied directly to perform switching between four FET elements 122A, 122A', 122B and 122B' at a predetermined timing, thereby applying power with a predetermined polarity while two of the FET elements are being driven simultaneously. The four FET elements 122A, 122A', 122B and 122B' are energized when the gate voltage $V_{gs}$ is applied as a gate signal to a gate electrode G, and this illustrative embodiment can present the cases where recovery loss is low even when a current of SiC-FET (silicon carbide FET), GaN-FET (gallium nitride FET) or the like flows back.

Next, with reference to FIGS. 3 and 4, a description will be made about a specific aspect of an output control method of the high-frequency power supply device according to a representative example of the present invention.

Figure 3:
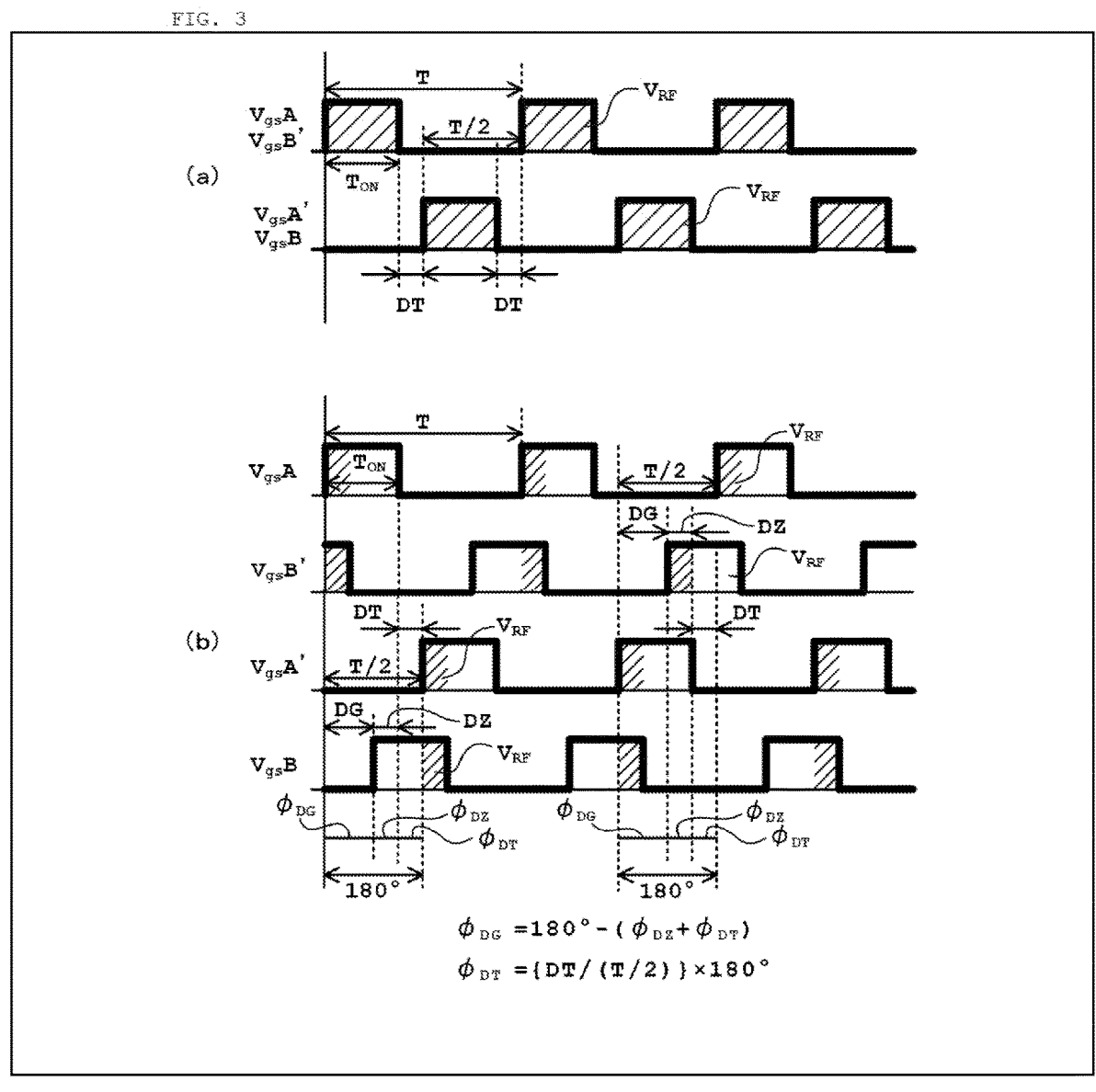
FIG. 3 is a time chart showing examples of gate signals input to FET elements shown in FIG. 2.

FIG. 3 is a time chart showing an example of the gate signals to be input to the FET elements shown in FIG. 2. FIG. 4 is a waveform chart showing a relationship between an input (DC voltage) and an output (AC voltage) in the high-frequency power supply device shown in FIG. 1.

FIG. 3(a) shows a gate signal $V_{gs}$ obtained by conventional output control in a high-frequency power supply device that includes a DC-DC conversion unit. In the conventional output control, for example, gate signals $V_{gs}A$ and $V_{gs}B'$, which are turned on simultaneously, are applied to the FET elements 122A and 122B' shown in FIG. 2. Then, after a lapse of a predetermined dead time DT, gate signals $V_{gs}A'$ and $V_{gs}B$, which are turned on simultaneously, are applied to the FET elements 122A' and 122B, respectively.

After a lapse of another dead time DT, the gate signals $V_{gs}A$ and $V_{gs}B'$ are applied again. Consequently, the conventional output control can remove ripples by a DC-DC conversion unit, and then output a high frequency AC output $V_{RF}$ in a shaded section.

FIG. 3($b$) shows a gate signal $V_{gs}$ obtained by the output control in the high-frequency power supply device shown in FIG. 1. The output control according to a representative example of the invention starts inputting of gate signals $V_{gs}B$ and $V_{gs}B'$ to the FET elements 122B and 122B' at timing lagging behind start times of inputting gate signals $V_{gs}A$ and $V_{gs}A'$ to the FET elements 122A and 122A' by a phase difference $\phi_{DG}$. In this case, the difference ODG is denoted as a phase angle that can be calculated by the following Formula 1 using a residual phase $\phi_{DZ}$ caused by rated outputting and a dead time phase $\phi_{DT}$ corresponding to a dead time.

$$\phi_{DG}=180°-(\phi_{DZ}+\phi_{DT}) \qquad 1$$

In this context, when a period of transmitting the gate signal $V_{gs}$ is T, the dead time phase $\phi_{DT}$ can be derived from the following Formula 2.

$$\phi_{DT}=\{DT/(T/2)\}\times180° \qquad 2$$

Figure 4:
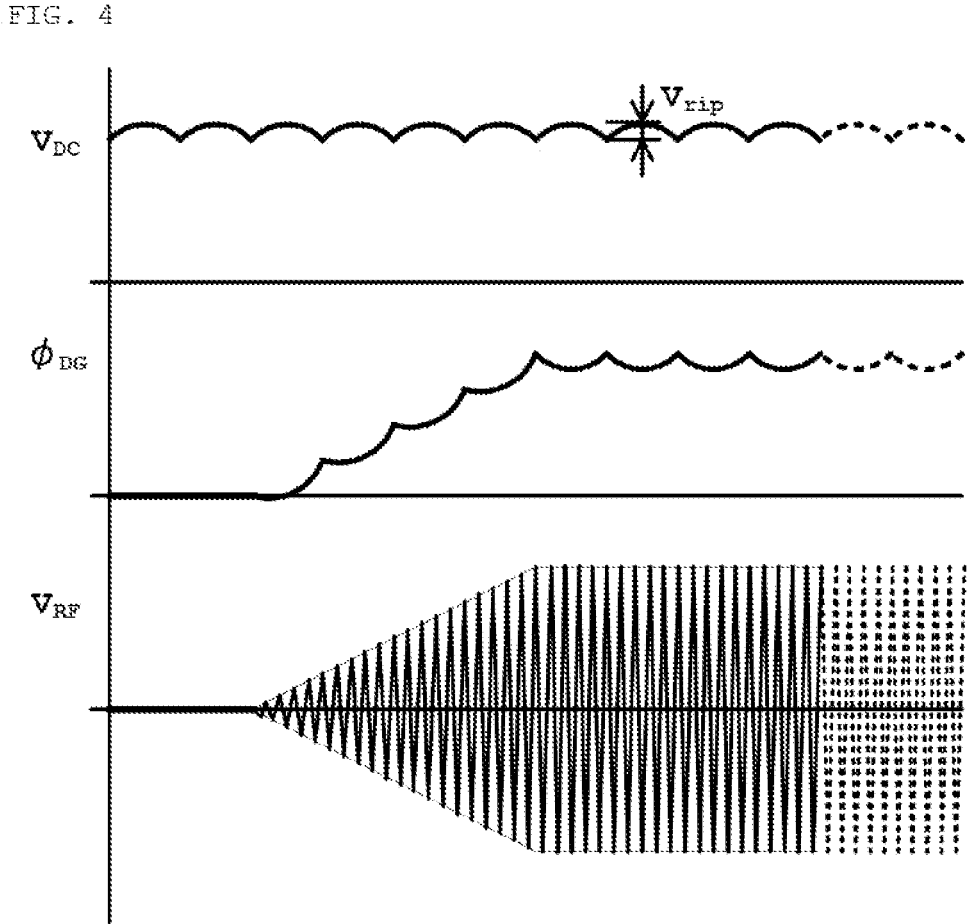
FIG. 4 is a waveform chart showing a relationship between an input (DC voltage) and an output (AC voltage) in the high-frequency power supply device shown in FIG. 1.

In the DC voltage $V_{DC}$ obtained by the conversion by the AC-DC conversion unit 110, which is the above-mentioned three-phase rectification circuit, three-phase power factor correction circuit or similar, a ripple component $V_{rip}$ remains as fluctuation corresponding to the six times frequency component of commercial three-phase alternating current, as shown in FIG. 4. Thus, by making the above-described phase difference ODG variable according to the fluctuation of the ripple component $V_{rip}$, it is possible to cancel the ripple component $V_{rip}$ of the DC voltage $V_{DC}$ to be input to the high-frequency amplifier 120. Such switching control is performed on the high-frequency amplifier 120 to thereby obtain a high frequency AC output $V_{RF}$ from which the ripple component $V_{rip}$ is removed.

In general, the ripple component $V_{rip}$ of the DC voltage $V_{DC}$ subjected to the three-phase rectification, or conversion, in the AC-DC conversion unit 110 is approximately 14% of an amplitude value of an AC waveform before the conversion. Thus, when an acceptable fluctuation range of the commercial three-phase AC voltage is 10%, it is preferable to ensure the residual phase $\phi_{DZ}$ according to the above Formula 1 to be at least 30°.

In this way, as shown in FIG. 3($b$), if the residual phase $\phi_{DZ}$ and the dead time phase $\phi_{DT}$ are made as small as possible and the phase differences $\phi_{DG}$ between the gate signals $V_{gs}A$ and $V_{gs}A'$ as well as signals $V_{gs}B$ and $V_{gs}B'$ are made as large as possible, the overlapping portion between them becomes large, so that the amplitude value of the high frequency AC output $V_{RF}$ that will be the final output can be made larger. On the other hand, as described above, since it is necessary to ensure that the residual phase $\phi_{DZ}$ is 30° or more in order to cancel the ripple component $V_{rip}$ of the DC voltage $V_{DC}$ to be input to the high-frequency amplifier 120, the adjustable range of the phase difference $\phi_{DG}$ is narrow even if the dead time DT can be minimized. Thus, in order to stably obtain the rated output, it is required to consider devising of design of the transformer 126 shown in FIG. 2.

The above-described control method enables to remove the ripple component contained in the DC voltage output from the AC-DC conversion unit without using a DC-DC conversion unit as with the conventional high-frequency power source. Thus, no DC-DC conversion unit and LC filter included in the conversion unit are needed, and thereby a response frequency of a feedback control loop is not limited with respect to the high-frequency amplifier, i.e. not limited to be one-tenth of an output frequency of the LC filter. It is therefore possible to increase a response speed of an AC voltage that will be eventually output (e.g., about 10 times faster than before).

Figure 5:
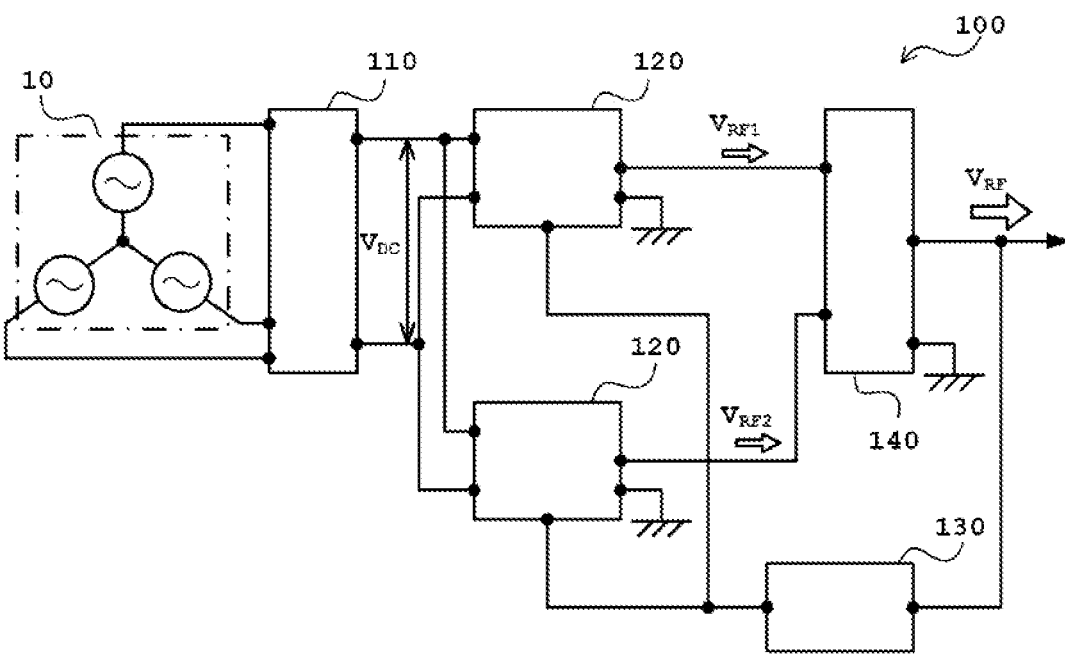
FIG. 5 is a block diagram showing schematically a high-frequency power supply device according to a variation of the invention.

FIG. 5 is a block diagram schematically showing a high-frequency power supply device according to a variation of the present invention. As shown in FIG. 5, a high-frequency power supply device 100 according to the variation includes the AC-DC conversion unit 110 shown in FIG. 1, a plurality of high-frequency amplifiers 120, a phase conversion circuit 130 connected to the plurality of high-frequency amplifiers 120, and an output synthesizing unit 140 arranged on output parts of the plurality of high-frequency amplifiers 120. More specifically, the high-frequency power supply device 100 according to the variation has the plurality of high-frequency amplifiers 120 arranged in parallel, each of the high-frequency amplifiers 120 being provided with one (single) phase conversion circuit 130 so as to be subjected to the output control.

The plurality of high-frequency amplifiers 120 is directly supplied with a DC voltage $V_{DC}$ output from the AC-DC conversion unit 110, and each of amplifiers independently outputs high frequency AC outputs $V_{RF1}$ and $V_{RF2}$. In this case, since the high-frequency amplifiers 120 are supplied with identical gate signals $V_{gs}A$ to $V_{gs}B'$ from the phase conversion circuit 130, it is possible to derive AC outputs $V_{RF1}$ and $V_{RF2}$ in which ripples are removed and phases are matched in the high-frequency amplifiers.

The output synthesizing unit 140 is configured to synthesize the AC outputs $V_{RF1}$ and $V_{RF2}$ input from the plurality of high-frequency amplifiers 120 to output them as a high frequency AC output $V_{RF}$. Thus, the magnitude (amplitude value) of the AC output $V_{RF}$ finally obtained by synthesizing the outputs from the plurality of high-frequency amplifiers 120 can be increased.

Figure 6:
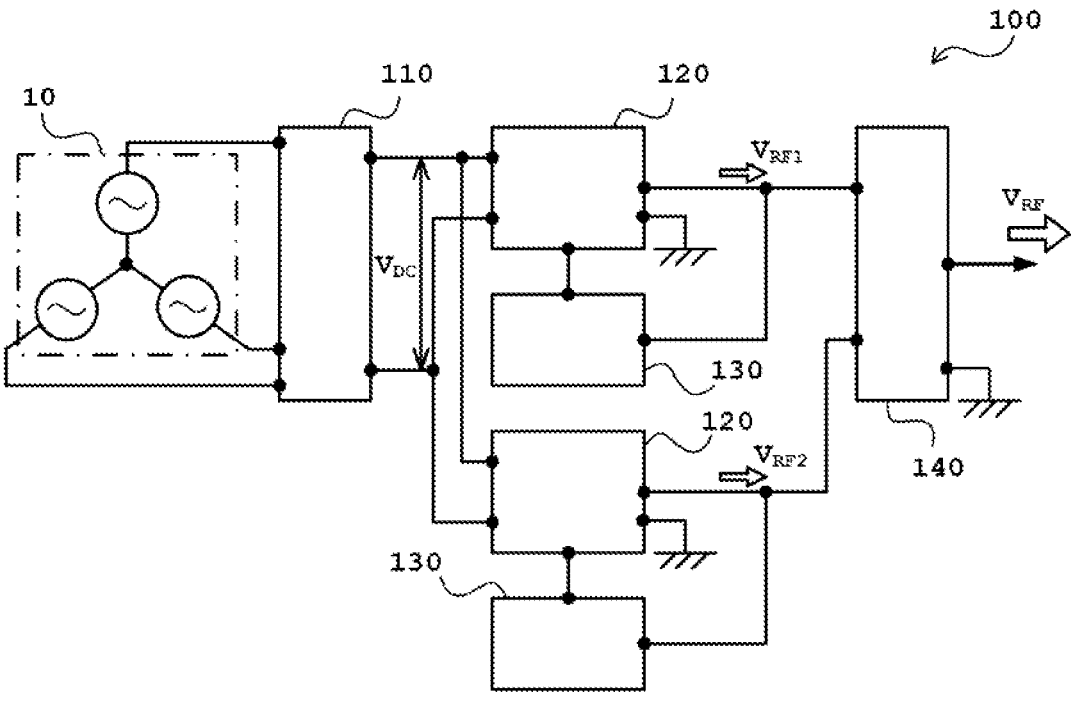
FIG. 6 is a block diagram showing schematically a high-frequency power supply device according to another variation of the invention.

FIG. 6 is a block diagram schematically showing a high-frequency power supply device according to another variation of the invention. As shown in FIG. 6, a high-frequency power supply device 100 according to another variation includes, as with the device shown in FIG. 5, an AC-DC conversion unit 110, a plurality of high-frequency amplifiers 120, phase conversion circuits 130 arrange for respective high-frequency amplifiers 120, and an output synthesizing unit 140 arranged on output parts of the plurality of high-frequency amplifiers 120. More specifically, the high-frequency power supply device 100 according to another variation has the plurality of high-frequency amplifiers 120 arranged in parallel, each of the plurality of high-frequency amplifiers 120 being provided with a phase conversion circuit 130 so as to be subjected to the output control.

In the high-frequency power supply device 100 with such configuration, each of the plurality of high-frequency amplifiers 120 is individually arranged together with the phase conversion circuit 130, so that an operation of removing a ripple component $V_{rip}$ in the DC voltage $V_{DC}$ to be input is performed in each of the high-frequency amplifiers 120 based on the AC voltage $V_{RF1}$ Or $V_{RF2}$. Consequently, the ripple removal is performed in individual high-frequency amplifiers 120, thereby enabling to enhance the effect of ripple reduction.

With the above configuration, the high-frequency power supply device and the output control method therefor according to the present invention can convert an input from a three-phase AC power source into a direct current and directly input it to a high-frequency amplifier, and provide a phase difference for cancelling a fluctuation component contained in the direct current to a gate signal to be input to each of a plurality of FET elements to thereby perform switching to generate high-frequency AC power. Thus, ripples caused by the conversion of the input from the three-phase AC power source into the direct current is reduced, and the output control can be performed at a high frequency band. That can achieve a response speed of the high-frequency amplifier adaptable for two-level pulse control for changing an output level of an output voltage at high speed, by way of example. Furthermore, since a DC-DC conversion unit, which is included in the conventional high-frequency power supply device, is not incorporated, the entire size of the power supply device can be reduced significantly.

The above embodiments are a few examples of the high-frequency power supply device and the output control method therefor of the present invention, and thus the present invention is not limited thereto. Furthermore, those skilled in the art can modify the present invention in various ways based on the gist of the invention, which modifications are not excluded from the scope of the present invention.

For example, the above embodiments illustrate the so-called voltage feedback control loop that adjusts the gate signals $V_{gs}A$ to $V_{gs}B'$ to be applied to the FET elements 122A to 122B' based on the output $V_{RF}$ from the high-frequency amplifier 120. However, a forward power feedback control loop for adjusting a forward wave component of a high frequency AC output $V_{RF}$ to be output may be employed. Furthermore, FIGS. 5 and 6 illustrate the variations in which two high-frequency amplifiers 120 are provided with one phase conversion circuit or separate phase conversion circuits 130. However, three or more high-frequency amplifiers 120 and the phase conversion circuit 130 may be arranged in parallel to each other.

REFERENCE SIGNS LIST

10 Three-Phase AC Power Source
100 High-Frequency Power Supply Device
110 AC-DC Conversion Unit
120 High-Frequency Amplifier
122 Full-Bridge Circuit
122A, 122A', 122B, 122B' FET Element
124 Coil
126 Transformer
128 Capacitor
130 Phase Conversion Circuit
132 Output Detection Unit
134 Error Calculation Control Unit
136 Gate Signal Generation Circuit
138 Output Command
140 Output Synthesizing Unit
$V_{DC}$ DC Voltage
$V_{RF}$ AC Output
$V_{gs}A$, $V_{gs}A'$, $V_{gs}B$, $V_{gs}B'$ Gate Signal
$V_{rip}$ Ripple Component
$\phi_{DG}$ Phase Difference
$\phi_{DZ}$ Residual Phase
$\phi_{DT}$ Dead Time Phase

The invention claimed is:

1. A high-frequency power supply device, comprising an AC-DC conversion unit that converts an input from a three-phase AC power source into a direct current, and a high-frequency amplifier that includes a plurality of FET elements to output high-frequency AC power, wherein an output from the AC-DC conversion unit is directly input to the high-frequency amplifier without a DC/DC converter and without an LC filter, and the high-frequency power supply device comprises a phase conversion circuit that provides a gate signal to be input to each of the plurality of FET elements with a phase difference for cancelling a fluctuation component contained in the direct current.

2. The high-frequency power supply device according to claim 1, wherein the phase difference includes a residual phase caused by rated outputting, the residual phase being 30° or more.

3. The high-frequency power supply device according to claim 1, wherein the phase conversion circuit comprises an output detection unit that detects output voltage or output power of the high-frequency amplifier, an error calculation control unit that determines an amount of operation for controlling the phase difference for the gate signal based on a difference between an output detection value detected by the output detection unit and an output command value, and a gate signal generation circuit that generates the gate signal set based on the amount of operation.

4. The high-frequency power supply device according to claim 1, wherein the high-frequency amplifier includes a plurality of high frequency amplifiers arranged in parallel, wherein the phase conversion circuit is connected to each of the plurality of high frequency amplifiers to which the plurality of high-frequency amplifiers amplifier a single phase difference being distributed by the phase conversion circuit, and an output synthesizing unit is disposed on output parts of the plural high-frequency amplifiers.

5. The high-frequency power supply device according claim 1, wherein the FET elements are SiC-FETs or GaN-FETs.

6. An output control method for outputting an input from a three-phase AC power source as high-frequency AC power by using a high-frequency amplifier including a plurality of FET elements, wherein the input from the three-phase AC power source is converted into a direct current to directly input it to the high-frequency amplifier without a DC/DC converter and without an LC filter, and a phase difference for cancelling a fluctuation component contained in the direct current is provided as a gate signal to be input to each of the plurality of FET elements, so as to perform switching to produce the high-frequency AC power.

7. The output control method according to claim 6, wherein the phase difference includes a residual phase caused by rated outputting, the residual phase being 30° or more.

8. The output control method according to claim 6, wherein the phase difference is set based on an amount of operation determined based on a difference between an output detection value obtained by detecting output voltage or output power by the high-frequency amplifier and an output command value.

9. The output control method according to claim 6, wherein the high-frequency amplifier includes a plurality of high frequency amplifiers arranged in parallel to which the plurality of plural high-frequency amplifiers amplify a single phase difference being distributed, and outputs from the plural high-frequency amplifiers are synthesized into the high-frequency AC power.

10. The output control method according to claim 6, wherein the FET elements are SiC-FETs or GaN.

* * * * *